United States Patent
Enderli et al.

(10) Patent No.: US 10,156,630 B2
(45) Date of Patent: Dec. 18, 2018

(54) METHOD FOR PASSIVELY LOCATING A NON-MOVABLE TRANSMITTER

(71) Applicant: THALES, Courbevoie (FR)

(72) Inventors: Cyrille Enderli, Elancourt (FR); Jean-François Grandin, Elancourt (FR); Hugo Seute, Elancourt (FR)

(73) Assignee: THALES, Courbevoie (FR)

( * ) Notice: Subject to any disclaimer, the term of this patent is extended or adjusted under 35 U.S.C. 154(b) by 95 days.

(21) Appl. No.: 15/526,751

(22) PCT Filed: Nov. 10, 2015

(86) PCT No.: PCT/EP2015/076227
§ 371 (c)(1),
(2) Date: May 13, 2017

(87) PCT Pub. No.: WO2016/083124
PCT Pub. Date: Jun. 2, 2016

(65) Prior Publication Data
US 2017/0336492 A1  Nov. 23, 2017

(30) Foreign Application Priority Data
Nov. 28, 2014  (FR) ..................... 14 02710

(51) Int. Cl.
*G01S 5/06* (2006.01)
*G01S 5/02* (2010.01)
*G01S 1/24* (2006.01)

(52) U.S. Cl.
CPC ............. *G01S 5/06* (2013.01); *G01S 1/245* (2013.01); *G01S 5/0278* (2013.01)

(58) Field of Classification Search
CPC ........... G01S 5/06; G01S 1/245; G01S 5/0278
(Continued)

(56) References Cited

U.S. PATENT DOCUMENTS 5,740,048 A * 4/1998 Abel .................... G01C 21/165
                                                701/470
6,330,452 B1 * 12/2001 Fattouche ............... G01S 1/045
                                                455/456.1
(Continued)

FOREIGN PATENT DOCUMENTS

| CH | 699 326 A1 | 2/2010 |
| FR | 3 000 223 A1 | 6/2014 |

OTHER PUBLICATIONS

Stephen Bancroft, "An Algebraic Solution of the GPS Equations," IEEE Transactions on Aerospace and Electronic Systems, vol. AES-21, No. 7 Jan. 1985, pp. 56-59.

*Primary Examiner* — Fayyaz Alam
(74) *Attorney, Agent, or Firm* — Baker & Hostetler LLP

(57) ABSTRACT

A method for passively locating a non-movable transmitter on the ground implemented by a group of at least one receiving station, each of the receiving stations comprising a detector of radars and a time reference, the set of time references being mutually synchronized, the transmitter transmitting a set of periodic pulses, wherein a first estimation of the position of the transmitter is carried out by the Bancroft scheme on the basis of the mean arrival times of the pulses transmitted by the transmitter at the level of each station of the group of at least one receiving station, the result obtained being used thereafter as point for initializing a maximum likelihood scheme so as to converge toward the position of the transmitter.

4 Claims, 3 Drawing Sheets

(58) Field of Classification Search
USPC .................. 455/13.2, 12.1, 7, 3.01–3.06
See application file for complete search history.

(56) References Cited

U.S. PATENT DOCUMENTS

| | | |
|---|---|---|
| 6,408,246 B1 | 6/2002 | Fox |
| 2004/0189521 A1 | 9/2004 | Smith et al. |
| 2005/0175038 A1* | 8/2005 | Carlson .................. G01S 5/14 370/503 |
| 2008/0186235 A1 | 8/2008 | Struckman et al. |
| 2011/0181469 A1* | 7/2011 | Eidloth .............. A63B 24/0021 342/387 |
| 2014/0368387 A1* | 12/2014 | Beutler ................ G01S 5/0278 342/463 |

* cited by examiner

METHOD FOR PASSIVELY LOCATING A NON-MOVABLE TRANSMITTER

CROSS-REFERENCE TO RELATED APPLICATIONS

This application is a National Stage of International patent application PCT/EP2015/076227, filed on Nov. 10, 2015, which claims priority to foreign French patent application No. FR 1402710, filed on Nov. 28, 2014, the disclosures of which are incorporated by reference in their entirety.

FIELD OF THE INVENTION

The present invention relates to the field of electromagnetic listening. The present invention relates more particularly to a method for passively locating a non-movable transmitter.

BACKGROUND

In an airborne or space context, passive locating of transmitters can be performed by various schemes such as for example, by measurements of angle of arrival (or AOA), of phase evolution over a large base (or LBI for "Long Base Interferometer" or LBPDE for "Long Base Phase Difference Evolution"), of arrival time differences (or TDOA for "Time Difference Of Arrival") between at least two carriers, or else by Lobe Transit Time Difference (LTTD).

Angle of arrival measurements are customarily used for passive location of transmitters. They require that the receivers be equipped either with an amplitude goniometer, or with an interferometer. The main defect of location by angle of arrival measurement is its lack of precision when the time allocated to location is short.

If a large base interferometer is available, it is possible to use LBPDE measurements, however these measurements are prone to ambiguities. Moreover, the current techniques of location by phase evolution on a large base or by arrival time difference do not take into account the periodic character of the most frequently encountered radar waveforms. This results, for these waveforms, in sub-optimal performance as much in terms of location precision as in terms of computational load and of use of the bandwidth between the carriers.

A so-called Bancroft location scheme is known from the prior art, in particular through "*An Algebraic Solution of the GPS Equations*" by Stephen Bancroft (IEEE Transactions AES VOL. AES-21, NO. 7 January 1985). In this publication, an explicit (non-iterative) least squares estimation of the position is set forth in a similar GPS context. The scheme does not make any particular assumption about the nature of the signal. However, if one attempts to directly extend the scheme presented to the case of a periodic pulse train, a system of three second-degree equations is found, which is not in general explicitly soluble. Moreover, numerous invalid solutions must be eliminated if the system is solved numerically.

A problem with passive location of transmitters with the aid of the pulse arrival times (or TOA for "Time Of Arrival") arises from the number of measurements to be processed. During the interception of a signal, a measurement of TOA is associated with each pulse received. The number of intercepted pulses, hence of pulse arrival time measurements, rapidly becomes very large since these pulses are transmitted at a very high rate. Moreover, with the existing solutions, computing a location on the basis of the TOAs involves estimating the arrival time of each pulse.

The complexity of the estimation problem will therefore grow rapidly with the number of pulses. For example, for an explicit algorithm based on the linear least squares scheme, the asymptotic complexity is given by $O(I^2 M)$ with I the number of unknown parameters to be estimated and M the number of measurements. In the case of estimation with the arrival times we have M=P (number of receivers)×N (number of pulses) and I=3 (space dimensions)+N (number of unknown transmission dates, i.e. number of pulses) i.e. an asymptotic complexity of $O(N^3 P)$ which is prohibitive in view of the number of pulses that might be received.

Concerning location based on pulse arrival time differences, since a difference between the measurements is computed, it is no longer necessary to estimate the dates of transmission of each pulse. However, the computation of this difference increases the variance of the measurements of TDOA with respect to those of TOA and causes correlations to appear between the measurements. The covariance matrix of the measurements of pulse arrival time differences is:

$$\Sigma_{TDOA} = \sigma_{TOA}^2 \cdot \begin{bmatrix} 2 & 1 & \cdots & 1 \\ 1 & 2 & \cdots & 1 \\ 1 & 1 & \ddots & \vdots \\ 1 & 1 & \cdots & 2 \end{bmatrix}$$

instead of:

$$\Sigma_{TOA} = \sigma_{TOA}^2 \cdot \begin{bmatrix} 1 & 0 & \cdots & 0 \\ 0 & 1 & \cdots & 0 \\ 0 & 0 & \ddots & \vdots \\ 0 & 0 & \cdots & 1 \end{bmatrix}$$

The increase in the diagonal terms and the introduction of off-diagonal terms in the covariance matrix of the measurements leads to a slight degradation in location performance.

Moreover, the elimination of the "date of transmission" parameter corresponding to the pulse transmission start date removes the possibility of introducing a priori knowledge about this parameter. However, an a priori makes it possible to introduce additional information into the estimator thereby making it possible to improve the performance of final location.

Another problem with passive location by TOA or TDOA is related to the communications between the platforms. One or the other of the two previous schemes involves a communication between the platforms so as to compute the location results. The information dispatched from one platform to the other is the arrival times of the received pulses. Since the number of pulses received is considerable and the arrival times must be dispatched precisely (coded on a number of considerable bits), there is therefore a strong constraint on the bitrate of the data link. Moreover these dispatches penalize the discretion of the platforms.

SUMMARY OF THE INVENTION

An aim of the invention is in particular to correct all or some of the drawbacks of the prior art by proposing a solution making it possible to improve the precision of location of a non-movable transmitter without penalizing the discretion of the detectors.

For this purpose, the subject of the invention is a method for passively locating a non-movable transmitter on the ground implemented by a group of at least two receiving stations, each of the receiving stations comprising a detector of radars and a time reference, the set of time references being mutually synchronized and said transmitter transmitting a set of periodic pulses, the duration of a pulse train being sufficiently short for each of the receiving stations to always have a trajectory that can be regarded as a uniform rectilinear motion, each receiving station being configured to measure arrival times of the pulses of the transmitter and to compute a mean arrival time of said pulses, said method being characterized in that a first estimation of the position of said transmitter is carried out by the Bancroft scheme on the basis of the mean arrival times of the pulses transmitted by the transmitter at the level of each station of the group of at least one receiving station, the result obtained being used thereafter as point for initializing a maximum likelihood scheme so as to converge toward the position of said transmitter.

According to an implementation variant, the method is implemented by at least two receiving stations and said method comprises:

A step Etp1 of measuring the arrival times of the pulses of the transmitter by each receiving station, A step Etp2 of computing the mean arrival time of the pulses by each receiving station, A step Etp3 of dispatching the computed mean arrival times of the pulses to a predetermined receiving station, A step Etp4 of computing, by said predetermined receiving station, the location of the transmitter on the basis of all the mean arrival times of the pulses with the aid of the Bancroft scheme and then of the maximum likelihood scheme.

According to an implementation variant, the receiving station or stations are are airborne receiving stations.

According to an implementation variant, the receiving station or stations are space receiving stations.

The advantages provided, in addition to the optimality of estimation in the cases of periodic transmitters, relate to the restricted quantity of data exchanged between the receiving stations as well as to the location precision achievable in as short a time as a radar pulse train. Moreover a considerable advantage afforded by the invention is a relevant initialization of the iterative algorithms for estimating the position on the basis of the arrival time measurements.

BRIEF DESCRIPTION OF THE DRAWINGS

Other particularities and advantages of the present invention will become more clearly apparent on reading the description hereinafter, given by way of nonlimiting illustration and with reference to the appended drawings, in which.

DETAILED DESCRIPTION

The principle of passive location according to the invention relies on estimating the position of a non-movable transmitter on the ground in two stages with the aid of two different computation schemes.

Conventionally, the computation of the position of a transmitter is performed with the aid of a maximum likelihood estimation. The problem is that this scheme is difficult to apply directly since it involves nonlinear equations that are complicated to solve. The estimator maximizes a function which comprises several local maxima. Moreover, this algorithm is very sensitive to the initial conditions and needs to have a good initialization in order to converge toward the global maximum likelihood.

The invention proposes to perform the optimization of the maximum likelihood criterion in two stages. A first summary estimation is made with the Bancroft scheme known to the person skilled in the art in particular through "*An Algebraic Solution of the GPS Equations*" by Stephen Bancroft (IEEE Transactions AES VOL. AES-21, NO. 7 January 1985). This first estimation is performed by assuming that the measurements are not noisy. The advantage of Bancroft's scheme is that it is explicit and therefore non-iterative. It makes it possible to reduce the equations to a least squares problem. The estimation obtained is thereafter used as initialization point for the maximum likelihood algorithm, which is itself iterative.

The advantage of using a first summary estimation is that it provides an initialization point, for the maximum likelihood algorithm, which is sufficiently close to the solution to converge toward the global maximum and not toward a local maximum. Moreover, this makes it possible to reduce the number of iterations of the maximum likelihood algorithm.

Figure 1:
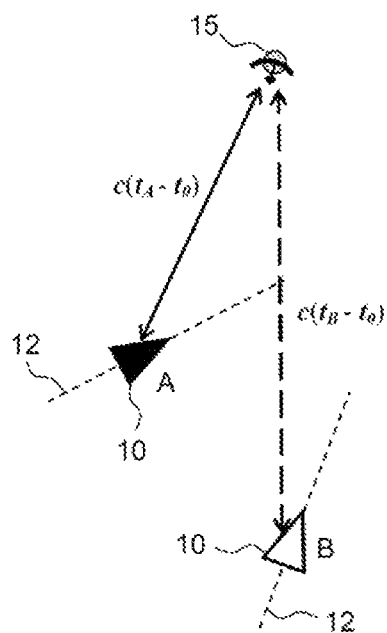
FIG. 1 illustrates an exemplary implementation of the method of location according to the invention.
Figure 2:
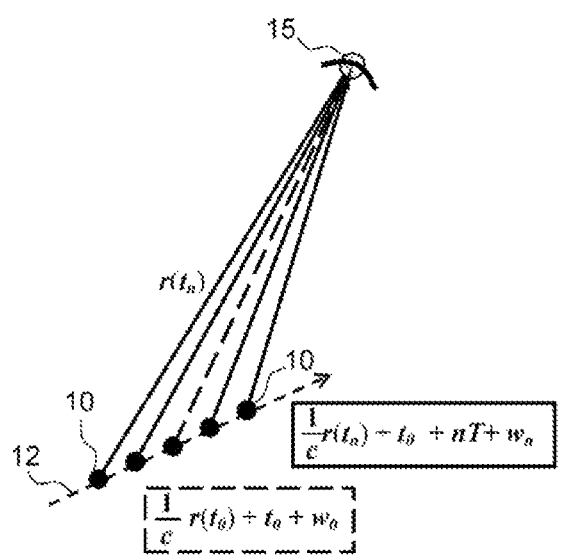
FIG. 2 represents the times of arrival of pulses at the level of a receiving station at various instants.

With reference to FIGS. 1 and 2, we consider P movable receiving stations 10, such as for example airborne or space receiving stations, with P any strictly positive integer. Each receiving station 10 comprises a detector of radars and a time reference which is configured such that the set of time references are mutually synchronized.

It is assumed that the transmitter 15 transmits a train of N periodic pulses (N representing a strictly positive integer) with a recurrence period denoted T. Under these conditions, the time of transmission of the $n^{th}$ pulse can be written:

$$t_0 + nT$$

where $t_0$ represents the time of the middle of the burst of pulses and where $$n = \frac{1-N}{2}, \ldots, 0, \ldots, \frac{N-1}{2}.$$

In order to simplify the expressions, the number of pulses N will be considered odd. Of course, the reasoning can be generalized to any strictly positive integer number N.

The arrival time $t_{n,p}$ of the pulse of index n at the $p^{th}$ receiving station (with p=1, ..., P) is the pulse transmission time plus the time of propagation to the station, with measurement noise. This arrival time can be written:

$$t_{n,p} = \frac{1}{c} r_p(t_{n,p}) + t_0 + nT + w_{n,p} \qquad (1)$$

where: c represents the propagation speed, $r_p(t_{n,p})$ represents the distance between the transmitter and the $p^{th}$ receiving station at the arrival time $t_{n,p}$, $t_0$ represents the time of transmission of the pulse, T represents the pulse repetition period $w_{n,p}$ represents the measurement noise, assumed Gaussian, centered and independent in n (from one measurement to the other) and in p (from one receiver to the other) with variance denoted $\sigma_{TOA}^2$.

It is assumed that the duration of a pulse train is sufficiently short for each of the P receiving stations to always have a trajectory 12 that can be regarded as a uniform rectilinear motion. Under these assumptions it may be verified that:

$$t_{n,p} \approx a_p + nT + w_{n,p}, \quad (2)$$

where:

$$a_p = \frac{r_{0,p}}{c} + t_0,$$

$r_{0,p}$ represents the distance between the transmitter and the $p^{th}$ receiving station in the middle of its trajectory, T represents the pulse recurrence period or repetition period;

$w_{n,p}$ represents the noise related to the $n^{th}$ pulse on the $p^{th}$ receiving station.

The model (2) will make it possible to estimate the pulse recurrence period T and the mean time of arrival of the pulses at the receiving station of index p, p varying from 1 to P.

The nonlinear relation between $(a_p)_{p=1 \ldots P}$ and the coordinates of the transmitter, which are implicit in $r_{0,p}$, will thereafter be able to be inverted by an explicit algorithm and this will provide a relevant initialization of the iterative algorithms for fine estimation of the position of the target.

We consider the particular case of the passive location of a transmitter 15 by a single receiving station 10. If P=1, equations (2) can be put into the following vector form:

$$\tau_1 = H_1 \theta_1 + w_1, \quad (3)$$

with:

$$\tau_1 = \begin{bmatrix} t_{-\frac{N-1}{2},1} \\ \vdots \\ t_{\frac{N-1}{2},1} \end{bmatrix}, H_1 = \begin{bmatrix} 1 & -\frac{N-1}{2} \\ \vdots & \vdots \\ 1 & \frac{N-1}{2} \end{bmatrix}, \theta_1 = \begin{bmatrix} a_1 \\ T \end{bmatrix} \text{ and }$$

$$w_1 = \begin{bmatrix} w_{-\frac{N-1}{2},1} \\ \vdots \\ w_{\frac{N-1}{2},1} \end{bmatrix}$$

The vectors $\tau_1$, $\theta_1$ and $w_1$ are of size N and the matrix $H_1$ is of size N×2. The components of the noise $w_1$ being Gaussian, centered and independent, the maximum likelihood estimation for the parameters $\theta_1$ is given by solving the least squares problem whose solution is conventionally given by:

$$\hat{\theta}_1 = (H_1^* H_1)^{-1} H_1^* \tau_1.$$

The matrix $H_1^* H_1$ is diagonal:

$$H_1^* H_1 = \begin{bmatrix} N & 0 \\ 0 & \frac{(N-1)N(N+1)}{12} \end{bmatrix},$$

whence the estimations:

$$\hat{a}_1 = \frac{1}{N} \sum_{n=-\frac{N-1}{2}}^{\frac{N-1}{2}} t_{n,1}$$

and $$\hat{T} = \frac{12}{(N-1)N(N+1)} \sum_{n=-\frac{N-1}{2}}^{\frac{N-1}{2}} n t_{n,1}$$

where $\hat{a}_1$ represents the estimation of the mean time of arrival of the pulses at the receiving station and the transmitter and $\hat{T}$ represents the estimation of the recurrence period.

The case of a number of receiving stations 10 at least equal to 2 is now considered.

If P>1, equations (2) can be put into a vector form similar to equation (3) above in the following manner:

$$\tau_P = H_P \theta_P + w_P.$$

Where, as blocks of size N associated with each of the P receiving stations, we have:

$$\tau_P = \begin{bmatrix} \begin{bmatrix} t_{-\frac{N-1}{2},1} \\ \vdots \\ t_{\frac{N-1}{2},1} \end{bmatrix} \\ \vdots \\ \begin{bmatrix} t_{-\frac{N-1}{2},P} \\ \vdots \\ t_{\frac{N-1}{2},P} \end{bmatrix} \end{bmatrix}, H_P = \begin{bmatrix} \begin{bmatrix} 1 \\ \vdots \\ 1 \end{bmatrix} \begin{bmatrix} 0 \\ \vdots \\ 0 \end{bmatrix} & \cdots & \begin{bmatrix} 0 \\ \vdots \\ 0 \end{bmatrix} \begin{bmatrix} -\frac{N-1}{2} \\ \vdots \\ \frac{N-1}{2} \end{bmatrix} \\ \begin{bmatrix} 0 \\ \vdots \\ 0 \end{bmatrix} \begin{bmatrix} 1 \\ \vdots \\ 1 \end{bmatrix} & \cdots & \begin{bmatrix} 0 \\ \vdots \\ 0 \end{bmatrix} \begin{bmatrix} -\frac{N-1}{2} \\ \vdots \\ \frac{N-1}{2} \end{bmatrix} \\ \vdots & \ddots & \vdots \\ \begin{bmatrix} 0 \\ \vdots \\ 0 \end{bmatrix} \begin{bmatrix} 0 \\ \vdots \\ 0 \end{bmatrix} & \cdots & \begin{bmatrix} 1 \\ \vdots \\ 1 \end{bmatrix} \begin{bmatrix} -\frac{N-1}{2} \\ \vdots \\ \frac{N-1}{2} \end{bmatrix} \end{bmatrix},$$

$$\theta_P = \begin{bmatrix} a_1 \\ \vdots \\ a_P \\ T \end{bmatrix} \text{ and } w_P = \begin{bmatrix} \begin{bmatrix} w_{-\frac{N-1}{2},1} \\ \vdots \\ w_{\frac{N-1}{2},1} \end{bmatrix} \\ \vdots \\ \begin{bmatrix} w_{-\frac{N-1}{2},P} \\ \vdots \\ w_{\frac{N-1}{2},P} \end{bmatrix} \end{bmatrix}.$$

The vectors $\tau_P$, $\theta_P$ and $w_P$ are of size NP and the matrix $H_P$ is of size NP×(P+1). Just as in the previous case where P=1, the components of the noise $w_P$ are Gaussian, centered and independent. If their variance is the same for all the stations, the maximum likelihood estimation for the parameters $\theta_P$ is again given by solving the least squares problem whose solution is:

$$\hat{\theta}_P = (H_P^* H_P)^{-1} H_P^* \tau_P.$$

The matrix $H_P^* H_P$ is diagonal:

$$H_P^* H_P = \begin{bmatrix} N & 0 & \cdots & 0 \\ 0 & N & \cdots & 0 \\ \vdots & \vdots & \ddots & \vdots \\ 0 & 0 & \cdots & \frac{P(N-1)N(N+1)}{12} \end{bmatrix},$$

whence the estimations:

$$\hat{a}_p = \frac{1}{N} \sum_{n=-\frac{N-1}{2}}^{\frac{N-1}{2}} t_{n,p}, \; p = 1 \ldots P.$$

$$\hat{T} = \frac{12}{P(N-1)N(N+1)} \sum_{p=1}^{P} \left( \sum_{n=-\frac{N-1}{2}}^{\frac{N-1}{2}} n t_{n,p} \right).$$

Where $\hat{a}_p$ represents the estimation of the mean time of arrival of the pulses at the receiving station of index p and the transmitter and $\hat{T}$ represents the estimation of the pulse recurrence period.

The expressions obtained show that the estimation method can be implemented by computing the mean time of arrival at each of the stations and then by pooling the results obtained so as to deduce therefrom an estimation of the position of the target.

The estimation of the recurrence period is given for its part by the mean of the P estimations performed individually by each station.

If the variance of the noise is not the same from one station to the other, the estimation of $\theta_p$ is modified into the solving of the weighted least squares problem, this changing only the final expression for $\hat{T}$ where the mean becomes a weighted mean, but not those for $\hat{a}_p$, $p=1 \ldots P$.

As seen previously, the estimation of the position of the transmitter is carried out in two stages. A first coarse estimation is computed by the Bancroft scheme. The result obtained is thereafter used as initialization point for a maximum likelihood scheme (also known by the initials MLE for "Maximum Likelihood Estimator").

The previously obtained expressions for $\hat{a}_p$ correspond to realizations of random variables with mean $$\frac{r_{0p}}{c} + t_0$$

and variance $$\frac{\sigma_{TOA}^2}{N}.$$

The Bancroft scheme consists in tailoring the unknown parameters, namely the position (x,y,z) of the transmitter and the transmission time $t_0$, to the values of $\hat{a}_p$ by neglecting the noise, by way of the relation linking the distances $r_{0p}$ to the positions of the transmitter and of the P receiving stations.

The relation between $r_{0p}$, the position (x,y,z) of the transmitter, and the position $(x_p, y_p, z_p)$ of the $p^{th}$ station is:

$$r_{0p} = \sqrt{(x-x_p)^2 + (y-y_p)^2 + (z-z_p)^2}.$$

Moreover, in the absence of noise, we have $$r_{0p} = c(\hat{a}_p - t_0).$$

By squaring the two expressions for $r_{0p}$, we obtain for every $p=1 \ldots P$:

$$x_p^2 + y_p^2 + z_p^2 - (c\hat{a}_p)^2 + x^2 + y^2 + z^2 - (ct_0)^2 = 2(xx_p + yy_p + zz_p - (c\hat{a}_p)(ct_0)).$$

The latter expression involves the Minkowski functional denoted $<.|.>$ such that for all vectors of dimension four $v=(v_1,v_2,v_3,v_4)$ and $w=(w_1,w_2,w_3,w_4)$ we have:

$$<v|w> = v_1 w_1 + v_2 w_2 + v_3 w_3 - v_4 w_4.$$

If we place the information related to a receiving station p in a vector $s_p$ and the unknowns in a vector u:

$$s_p = \begin{bmatrix} x_p \\ y_p \\ z_p \\ c \cdot \hat{a}_p \end{bmatrix}; \; u = \begin{bmatrix} x \\ y \\ z \\ c \cdot t_0 \end{bmatrix}.$$

By introducing the following matrix B:

$$B = \begin{bmatrix} x_1 & y_1 & z_1 & -c \cdot \hat{a}_1 \\ x_2 & y_2 & z_2 & -c \cdot \hat{a}_2 \\ \vdots & \vdots & \vdots & \vdots \\ x_P & y_P & z_P & -c \cdot \hat{a}_P \end{bmatrix},$$

and by putting:

$$k = \frac{1}{2} \begin{bmatrix} <s_1|s_1> \\ <s_2|s_2> \\ \vdots \\ <s_P|s_P> \end{bmatrix}, \; \Lambda = \frac{1}{2}<u|u>, \; e = \begin{bmatrix} 1 \\ 1 \\ \vdots \\ 1 \end{bmatrix},$$

the P equations in the unknowns may be written in a compact manner:

$$Bu = \Lambda e + k.$$

The above system is over-dimensioned for a number of receiving stations greater than 4 (P equations for 4 unknowns). This system can be solved with the pseudo-inverse $B^+$ of the matrix B by assuming $\Lambda$ is known in a first stage:

$$B^+ = (B^*B)^{-1} B^*.$$

$$u = B^+(k + \Lambda e).$$

By using the latter expression for u to expand the expression for $\Lambda = <u|u>$, we obtain a trinomial of second degree in $\Lambda$:

$$\Lambda^2 <B^+e, B^+e> + \Lambda(2<B^+k, B^+e> - 1) + <B^+k, B^+k> = 0.$$

The latter provides two candidate solutions for $\Lambda$, denoted $\Lambda_1$ and $\Lambda_2$, leading to two possible solutions $u_1$ and $u_2$ to the problem:

$$u_1 = B^+(k + \Lambda_1 e); \; u_2 = B^+(k + \Lambda_2 e).$$

One of these two solutions will be coherent with respect to the situation. For example, the estimated altitude will be close to the surface of the earth.

As seen previously, the position found by the Bancroft scheme is thereafter used as initialization point for a maximum likelihood estimation.

In this second estimation, we now take into account the noise $w_n$ in the pulse arrival time measurements. The expression for the $\widetilde{a_p}$ s becomes:

$$\widetilde{a_p} = \frac{1}{c}\sqrt{(x_p - x)^2 + (y_p - y)^2 + (z_p - z)^2} + t_0 + w_n = f_p(x, y, z, t_0) + w_n$$

where: c represents the speed of propagation of the pulses,
(x, y, z) represents the coordinates of the position of the transmitter,
$(x_p, y_p, z_p)$ represents the coordinates of the position of the $p^{th}$ receiving station,
$t_0$ represents the pulse transmission start date,
$f_p$ represents a nonlinear function which links the position of the transmitter and the transmission start date. This function $f_p$ represents the arrival time of the pulse without noise at the level of the $p^{th}$ station,
$w_n$ represents the measurement noise considered to be Gaussian noise of variance $$\sigma_a^2 = \frac{\sigma_{TOA}^2}{N}$$

with $\sigma_{TOA}^2$ the instrumental variance of the measurement of the TOAs and N the number of periodic pulses considered.

According to one mode of implementation of the invention the maximum likelihood scheme can contain an a priori on the parameter $t_0$ corresponding to the date of transmission of the pulse at the center of the pulse train transmitted by the transmitter. It is possible to consider, without loss of generality, that the pulses are dated by taking as origin the date of reception of the central pulse by the first receiving station (10): $\widetilde{a_1} = 0$.

Thus if it is considered that the transmitter-receiving stations distances are much greater than the distances between the receiving stations (case of short bases: for example the distance between the transmitter and the stations may be of the order of 200 km whilst the distance between the stations may be of the order of a km), it may be considered that the distance $d_0 = c(\widetilde{a_1} - t_0) = -c \cdot t_0$ corresponding to a coarse distance between the receiving stations and the transmitter may be modeled by a random variable with expectation denoted $\widehat{d_0}$ and with variance denoted $\sigma_{d_0}^2$ that is relatively high.

$\widehat{d_0}$ is chosen close to the range limit of the receivers. This amounts to eliminating positions that are too distant, which would be incoherent since in this case the signal would not have been picked up, and those that are too close, since it is assumed that the signal would have been picked up beforehand.

In practice, even if the transmitter is very close to the receiving stations, this a priori introduces hardly any bias since the information that it affords becomes increasingly negligible compared with the information afforded by the actual measurements as the transmitter approaches.

For the P receiving stations we have the following vector of measurements:

$$\begin{bmatrix} \widetilde{a_1} \\ \widetilde{a_p} \\ \vdots \\ \overline{-d_0}/c \end{bmatrix} = \begin{bmatrix} \frac{1}{c}\sqrt{(x_1 - x)^2 + (y_1 - y)^2 + (z_1 - z)^2} + t_0 \\ \vdots \\ \frac{1}{c}\sqrt{(x_p - x)^2 + (y_p - y)^2 + (z_p - z)^2} + t_0 \\ t_0 \end{bmatrix} + $$

$$w = \begin{bmatrix} f_1(x, y, z, t_0) \\ \vdots \\ f_P(x, y, z, t_0) \\ t_0 \end{bmatrix} + w$$

The covariance matrix related to these measurements (which are assumed to be independent) is:

$$\Sigma = \begin{bmatrix} \sigma_a^2 & \cdots & 0 & 0 \\ \vdots & \ddots & \vdots & \vdots \\ 0 & \cdots & \sigma_a^2 & 0 \\ 0 & \cdots & 0 & \sigma_{d_0}^2/c^2 \end{bmatrix}$$

If a linear approximation is made at the point $(x_i, y_i, z_i, t_{0_i})$ for the functions $f_p$, we obtain:

$$\widetilde{a_p} = f_p(x_i, y_i, z_i, t_{0_i}) + \left(\frac{\partial f_p}{\partial x} \frac{\partial f_p}{\partial y} \frac{\partial f_p}{\partial z} \frac{1}{c}\frac{\partial f_p}{\partial t_0}\right)_{x_i, y_i, z_i, t_{0_i}} \times \begin{bmatrix} x - x_i \\ y - y_i \\ z - z_i \\ c(t_0 - t_{0_i}) \end{bmatrix}$$

with $$\left(\frac{\partial f_p}{\partial x}\right)_{x_i, y_i, z_i, t_{0_i}} = \frac{x_i - x_p}{c\sqrt{(x_p - x_i)^2 + (y_p - y_i)^2 + (z_p - z_i)^2}}$$

$$\left(\frac{\partial f_p}{\partial y}\right)_{x_i, y_i, z_i, t_{0_i}} = \frac{y_i - y_p}{c\sqrt{(x_p - x_i)^2 + (y_p - y_i)^2 + (z_p - z_i)^2}}$$

$$\left(\frac{\partial f_p}{\partial z}\right)_{x_i, y_i, z_i, t_{0_i}} = \frac{z_i - z_p}{c\sqrt{(x_p - x_i)^2 + (y_p - y_i)^2 + (z_p - z_i)^2}}$$

$$\left(\frac{1}{c}\frac{\partial f_p}{\partial t_0}\right)_{x_i, y_i, z_i, t_{0_i}} = \frac{1}{c}$$

We consider an intermediate variable $\varepsilon$ defined by:

$$\varepsilon = \begin{bmatrix} \frac{\partial f_1}{\partial x} & \frac{\partial f_1}{\partial y} & \frac{\partial f_1}{\partial z} & \frac{1}{c} \\ \vdots & \vdots & \vdots & \vdots \\ \frac{\partial f_P}{\partial x} & \frac{\partial f_P}{\partial y} & \frac{\partial f_P}{\partial z} & \frac{1}{c} \\ 0 & 0 & 0 & \frac{1}{c} \end{bmatrix}_{x_i, y_i, z_i, t_{0_i}} \times \begin{bmatrix} x - x_i \\ y - y_i \\ z - z_i \\ c(t_0 - t_{0_i}) \end{bmatrix} -$$

-continued $$\left(\begin{bmatrix} \widehat{a_1} \\ \vdots \\ \widehat{a_P} \\ -\widehat{d_0}/c \end{bmatrix} - \begin{bmatrix} f_1(x_i, y_i, z_i, t_{0_i}) \\ \vdots \\ f_P(x_i, y_i, z_i, t_{0_i}) \\ t_{0_i} \end{bmatrix}\right) = M\Delta - R$$

With:

$$M = \begin{bmatrix} \frac{\partial f_1}{\partial x} & \frac{\partial f_1}{\partial y} & \frac{\partial f_1}{\partial z} & \frac{1}{c} \\ \vdots & \vdots & \vdots & \vdots \\ \frac{\partial f_P}{\partial x} & \frac{\partial f_P}{\partial y} & \frac{\partial f_P}{\partial z} & \frac{1}{c} \\ 0 & 0 & 0 & \frac{1}{c} \end{bmatrix}_{x_i, y_i, z_i, t_{0_i}},$$

$$\Delta = \begin{bmatrix} x - x_i \\ y - y_i \\ z - z_i \\ c(t_0 - t_{0_i}) \end{bmatrix} \text{ and } R = \left(\begin{bmatrix} \widehat{a_1} \\ \vdots \\ \widehat{a_P} \\ -\widehat{d_0}/c \end{bmatrix} - \begin{bmatrix} f_1(x_i, y_i, z_i, t_{0_i}) \\ \vdots \\ f_P(x_i, y_i, z_i, t_{0_i}) \\ t_{0_i} \end{bmatrix}\right)$$

This matrix variable ε represents the approximation error at the current iteration. The first column represents the approximation error in x, the second in y, the third in z and the last in $t_0$.

We minimize the criterion c defined by:

$$c = \varepsilon^T \Sigma^{-1} \varepsilon = (M\Delta - R)^T \Sigma^{-1} (M\Delta - R)$$

This amounts to minimizing the norm of the error vector weighted by the matrix Σ which contains the variances of the estimators $\widehat{a_p}$.

We therefore obtain a new estimation of the position with:

$$\Delta = (M^T \Sigma^{-1} M)^{-1} M^T \Sigma^{-1} R$$

The procedure is repeated until Δ, the vector of displacement toward the new position, is less than a predetermined threshold. According to a mode of implementation, it is possible to choose as constraint, for example, $\|\Delta\| < 1$ m.

Figure 3:
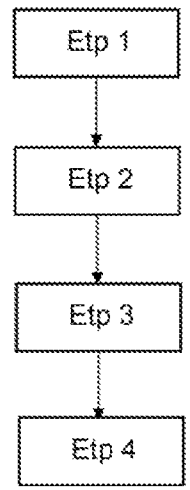
FIG. 3 illustrates possible steps of the method of location according to the invention.

FIG. 3 represents possible steps of the method of passive location according to the invention in the case where it is implemented by at least two receiving stations 10. As seen previously, it is assumed that each receiving station 10 comprises a time reference and that all the time references are mutually synchronized.

The method comprises a first step Etp1 of receiving the pulses and of measuring the arrival times of each pulse of the transmitter 15 by each of the receiving stations 10.

The mean time of arrival of the pulses at the level of the receiving stations 10 is thereafter computed by each receiving station in the course of a step Etp2. During this step, each receiving station performs a compression of the pulses received by computing the mean of the arrival times.

In the course of a dispatching step Etp3, each mean time computed by each receiving station 10 is dispatched to a predetermined receiving station. This predetermined station will be charged with estimating the position of the transmitter on the basis of the mean times dispatched in the course of a computation step Etp4 with the aid of the Bancroft scheme and then of the maximum likelihood scheme.

In an advantageous manner, each receiving station 10, other than said predetermined receiving station 10, dispatches not each of the arrival times of the pulses received ($t_{np}$) but the mean arrival times ($\hat{a}_p$). This makes it possible to reduce the inter-receiving station data bitrate and therefore allows greater discretion.

Tables 1 and 2 hereinbelow illustrate examples of results obtained by applying the method according to the invention.

Figure 4:
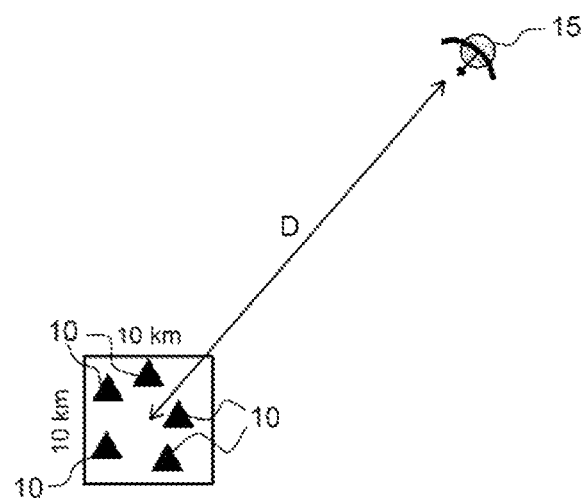
FIG. 4 represents the configuration used for the results presented.

FIG. 4 illustrates the geometric configuration associated with the results presented. A non-movable transmitter 15 and a group of P receiving stations 10 is considered. It is assumed that the receiving stations 10 are uniformly distributed over a 10 km×10 km base. Of course this example is wholly non-limiting and the various stations 10 can be distributed in a nonuniform manner. The distance between the center of this base and the transmitter 15 is denoted D.

In these measurements, the fixed parameters are:
  $\sigma_{TOA}$=30 ns: noise of measurement of the TOA on each receiver,
  $d_0$ =200 km: a priori on the transmitter-base distance,
  $\sigma_{d_0}$=50 km: standard deviation of the a priori,
  Problem reduced to two dimensions.

Tables 1 and 2 present the standard deviations of error in the coordinates [x y] of the position of the transmitter for a number of pulses N respectively equal to 30 and 3.

The performance of the method according to the invention (denoted E-TOA) is compared with that (denoted E-TDOA) of an estimator of the conventional TDOA by maximum likelihood type for various numbers of receiving stations P and various base-transmitter distances D.

TABLE 1

| | N = 30 | |
|---|---|---|
| Parameters | D = 200 km | D = 60 km |
| P = 4 | E-TOA: 4.86 km | E-TOA: 404 m |
| | E-TDOA: 5.26 km | E-TDOA: 412 m |
| P = 8 | E-TOA: 3.04 km | E-TOA: 236 m |
| | E-TDOA: 3.35 km | E-TDOA: 261 m |

TABLE 2

| | N = 3 | |
|---|---|---|
| Parameters | D = 200 km | D = 60 km |
| P = 4 | E-TOA: 12.3 km | E-TOA: 1.28 km |
| | E-TDOA: 16.7 km | E-TDOA: 1.33 km |
| P = 8 | E-TOA: 9.21 km | E-TOA: 799 m |
| | E-TDOA: 11.6 km | E-TDOA: 873 km |

Figure 5:
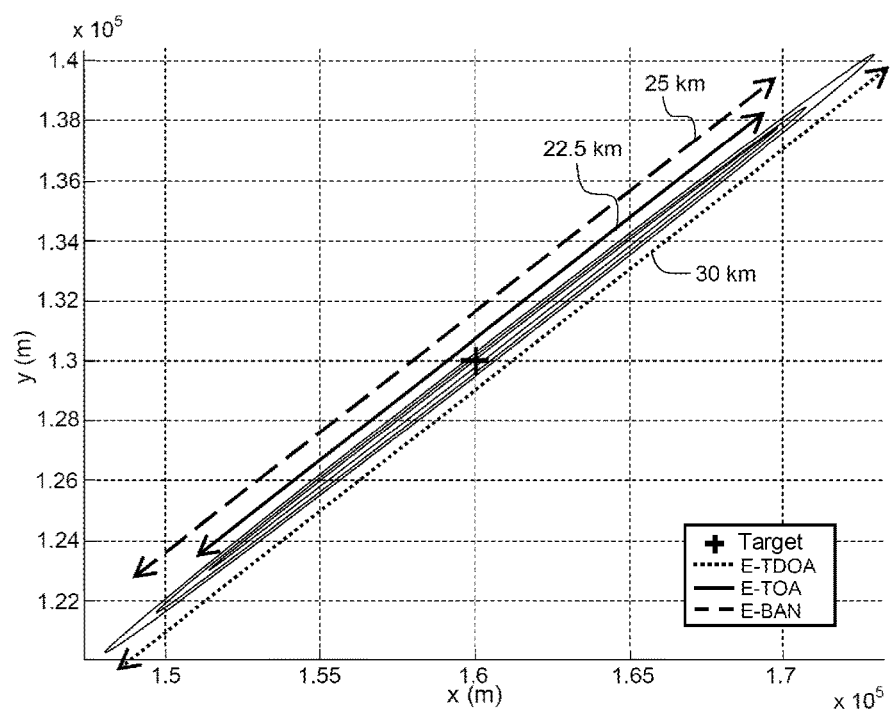
FIG. 5 represents examples of 90% confidence ellipses obtained with the aid of the method according to the invention.

FIG. 5 illustrates examples of 90% confidence ellipses obtained with the aid of the method according to the invention denoted E-TOA, with the aid of an estimator using the conventional maximum likelihood scheme denoted E-TDOA and with Bancroft's scheme denoted E-BAN. In this example, P=8 receiving stations, N=10 pulses, and D=200 km. The center of the base containing the receiving stations is situated at (0, 0).

Tables 1 and 2 as well as FIG. 5 demonstrate the better precision of location of the method according to the invention with respect to the conventional schemes.

As seen previously, the fact of dispatching the mean times of arrival of the pulses rather than all the pulses received makes it possible to reduce the quantity of data exchanged between the receiving stations and therefore allows greater discretion of the stations.

The table hereinbelow presents the number of transfers of data between two receiving stations for N=3 and N=100 pulses in the case of the method according to the invention (E-TOA) and that of an estimator using the conventional maximum likelihood scheme (E-TDOA).

TABLE 3

| Estimator | N = 3 | N = 100 |
|---|---|---|
| E-TOA | 1 | 1 |
| E-TDOA | 3 | 99 |

The present invention has been described through an airborne application, this description is wholly non-limiting and can be generalized to other sectors such as for example the space sector.

The invention claimed is:

1. A method for passively locating a non-movable transmitter on the ground implemented by a group of at least two receiving stations, each of the receiving stations comprising a detector of radars and a time reference, the set of time references being mutually synchronized, said transmitter transmitting a set of periodic pulses, the duration of a pulse train being sufficiently short for each of the receiving stations to always have a trajectory that can be regarded as a uniform rectilinear motion, each receiving station being configured to measure arrival times of the pulses of the transmitter and to compute a mean arrival time of said pulses, said method wherein a first estimation of the position of said transmitter is carried out by the Bancroft scheme on the basis of the mean arrival times of the pulses transmitted by the transmitter at the level of each station of the group of at least two receiving stations, the estimation obtained being used thereafter as point for initializing a maximum likelihood scheme so as to converge toward the position of said transmitter.

2. The method as claimed in claim 1, implemented by at least two receiving stations in which said method comprises:
   A step Etp1 of measuring the arrival times of the pulses of the transmitter by each receiving station,
   A step Etp2 of computing the mean arrival time of the pulses by each receiving station,
   A step Etp3 of dispatching the computed mean arrival times of the pulses to a predetermined receiving station,
   A step Etp4 of computing, by said predetermined receiving station, the location of the transmitter on the basis of all the mean arrival times of the pulses with the aid of the Bancroft scheme and then of the maximum likelihood scheme.

3. The method as claimed in claim 1, wherein the receiving station or stations are airborne receiving stations.

4. The method as claimed in claim 1, wherein the receiving station or stations are space receiving stations.

* * * * *